(12) United States Patent
You et al.

(10) Patent No.: US 9,030,919 B2
(45) Date of Patent: May 12, 2015

(54) COMBINED BROADBAND OCEAN BOTTOM SEISMOGRAPH WITH SINGLE GLASS SPHERE

(75) Inventors: Qingyu You, Beijing (CN); Tianyao Hao, Beijing (CN); Chunlei Zhao, Beijing (CN)

(73) Assignee: Institute of Geology and Geophysics, Chinese Academy, Beijing (CN)

( * ) Notice: Subject to any disclaimer, the term of this patent is extended or adjusted under 35 U.S.C. 154(b) by 813 days.

(21) Appl. No.: 13/379,339

(22) PCT Filed: Sep. 23, 2011

(86) PCT No.: PCT/CN2011/080108
§ 371 (c)(1),
(2), (4) Date: Dec. 19, 2011

(87) PCT Pub. No.: WO2012/155433
PCT Pub. Date: Nov. 22, 2012

(65) Prior Publication Data
US 2012/0294123 A1    Nov. 22, 2012

(30) Foreign Application Priority Data
May 17, 2011    (CN) .......................... 2011 1 0126843

(51) Int. Cl.
*G01V 1/18* (2006.01)

(52) U.S. Cl.
CPC ...................................... *G01V 1/18* (2013.01)

(58) Field of Classification Search
CPC ..................................................... G01V 1/18
USPC ............ 367/15, 133, 181, 188; 181/110, 112, 181/122; 114/257, 264, 333; 337/150; 405/205; 73/649
See application file for complete search history.

(56) References Cited

U.S. PATENT DOCUMENTS 3,316,531 A * 4/1967 Baker ........................... 367/118
3,719,048 A * 3/1973 Arne et al. .................... 405/205
(Continued)

FOREIGN PATENT DOCUMENTS

CN    101639538 A    2/2010
CN    201654246      11/2010
(Continued)

OTHER PUBLICATIONS

International Search Report for International Application PCT/CN2011/080108 dated Mar. 1, 2012.

*Primary Examiner* — Isam Alsomiri
*Assistant Examiner* — Amienatta M Ndure Jobe
(74) *Attorney, Agent, or Firm* — Karim Lagobi

(57) ABSTRACT

The invention provides a broadband ocean bottom seismograph with a single glass sphere. The seismograph comprises an anchor at its bottom having a frame structure with a rigid ring for accommodating a seismometer chamber. The seismometer chamber comprises a bell-shaped protective hood opening downward where a seismometer sealed chamber is suspended to the inner surface of the protective hood by cables. The bottom of the seismometer sealed chamber protrudes through the opening of the protective hood to be seated in direct contact with the seabed. A functional chamber comprises a plastic instrument chamber and a glass global instrument chamber secured in the plastic chamber. The plastic instrument chamber is fixedly mounted on top of the protective hood. A release mechanism is mounted on the top of the functional chamber, and connected to frame of the anchor via fusible tensioning steel wires.

16 Claims, 7 Drawing Sheets

(56) References Cited

U.S. PATENT DOCUMENTS 4,300,254 A    11/1981  Prior
4,692,906 A *  9/1987  Neeley ........................... 367/15
6,932,185 B2 * 8/2005  Bary et al. .................... 181/122

FOREIGN PATENT DOCUMENTS

| CN | 101441274 | 1/2011 |
| RU | 229400 | 2/2007 |
| SU | 1116406 A | 9/1984 |

* cited by examiner ated on May 17, 2011 in
COMBINED BROADBAND OCEAN BOTTOM SEISMOGRAPH WITH SINGLE GLASS SPHERE

CROSS-REFERENCE TO RELATED APPLICATION

This application claims the benefit of Chinese Patent Application No. 201110126843.2 filed on May 17, 2011 in the State Intellectual Property Office of China, the whole disclosure of which is incorporated herein by reference.

BACKGROUND OF THE INVENTION

1. Field of the Invention

The present invention relates to a field of observing natural earthquake, and more particularly, relates to a combined broadband ocean bottom seismograph (OBS) with single glass sphere.

2. Description of the Related Art

Institute of Geology and Geophysics, Chinese Academy of Sciences is a major institution in China engaging in researching and developing ocean bottom seismograph and takes on most of tasks for developing ocean bottom seismograph in China. In the special development program financially supported by Ministry of Finance for developing important scientific research equipment during the Outline of the Eleventh Five-Year Plan of China, Institute of Geology and Geophysics, Chinese Academy of Sciences developed a seven-channel multifunctional ocean bottom seismograph, and has successfully put it into use in the South China Sea, the Yellow Sea and the Bohai Sea and has obtained a great amount of valuable scientific data.

FIG. 1 is a structural view of a conventional multifunctional ocean bottom seismograph with seven-channels. As shown in FIG. 1, the conventional multifunctional ocean bottom seismograph with seven-channels comprises a release mechanism, a plastic instrument chamber, a glass instrument sphere and an anchor. The release mechanism is provided at the top end of the plastic instrument chamber. The glass instrument sphere is fixedly mounted inside the plastic instrument chamber. The anchor is provided at the bottom of the plastic instrument chamber. The release mechanism and the anchor are connected with each other by tensioning steel wires so that the instrument chamber is secured in the anchor. Inside the glass instrument sphere is provided with a battery unit, an O-ring, a broadband three-component leveling seismometer, a three-component high frequency detector, a normally-horizontal support, electronic circuit, an acquisition system and a water acoustic communication module and the like. The battery unit is disposed in the lower half of the glass instrument sphere via the O-ring. The broadband three-component attitude control seismometer and the three-component high frequency detector are integrated with each other by screws to form a seismometer assembly. The seismometer assembly is connected to the normally-horizontal support inside the glass instrument sphere via bearings to rotate freely within a working angle of 30 degree. The electronic circuit, the acquisition system, and the water acoustic communication module are secured on the top of the seismometer assembly comprising the broadband three-component attitude control seismometer and the three-component high frequency detector to integrate into a unit inside the glass global chamber.

With the conventional multifunctional ocean bottom seismograph with seven-channels, the seismometer assembly is disposed inside the glass instrument sphere which is enclosed by the plastic instrument chamber, and the plastic instrument chamber is coupled to the anchor and the anchor is then coupled to the seabed. Due to such multiple coupling, the data recorded by the seismometer assembly are amplified by the plastic chamber, the anchor and other relevant components. Furthermore, it is difficult to ensure the sufficient coupling strength during assembly of these components, which adversely affects the seismic record and results in large error in obtained data.

In addition, Woods Hole Oceanographic Institution (WHOI) and Scripps Institution of Oceanography (SIO) develop a kind of ocean bottom seismograph, which mainly comprises a cantilever beam for hanging the seismometer so that the seismometer works on the seabed directly. In order to keep away from the anchor and floating ball, the cantilever beam must have a certain length, and to avoid external torque influence due to external condition, the seismometer is disposed in a separate glass sphere. To provide sufficient buoyancy, multiple spheres are necessary. Typically, there are four to eight glass spheres, so that the weight of the seismograph amounts to several hundreds kilogram or more, and the manufacture cost is increased greatly. The price of a single seismograph is nearly one million Renminbi (RMB). Further, it increases difficulty in putting the seismograph into operation under sea and recovering it from the ocean bottom. FIG. 2 shows a structure of the seismograph provided by WHOI.

Presently, with the higher requirements for performance of the ocean bottom seismograph, the ocean bottom seismographs developed in several countries and the broadband multifunctional ocean bottom seismograph with seven-channels previously developed by the applicant have some disadvantages: there is much difference in performance of the ocean bottom seismograph when it works in sea water environment and on land. The frequency of the natural seismic signal is in the range of 0.01-10 Hz. The coupling between the ocean bottom seismograph and the seabed has apparent influence on the data quality in seismic observation, and the surging of the sea water has great influence on the horizontal signal recorded by the instrument during work. Firstly, the less the pressure on the seabed applied by the ocean bottom seismograph, the better the coupling between the ocean bottom seismograph and the seabed. In other words, the more proximity between the density of the ocean bottom seismograph and the density of the sea water, the better the recording effect. Secondly, since the inconsistency between the vibration of the seabed and the motion of the sea water, the ocean bottom seismograph will be affected by additional moments when it is recording signals, and the higher the ocean bottom seismograph, the longer the equivalent arm of force, resulting in a greater influence.

For the above reasons, the current broadband multifunctional ocean bottom seismograph with seven-channels in which the seismometer is integrally mounted inside the glass instrument chamber cannot resist well the impact of sea water flow and there is great distortion of recorded signal. On the other hand, the broadband ocean bottom seismograph with a cantilever beam cannot be broadly used due to the weight and the cost.

SUMMARY OF THE INVENTION

Considering the above, a main object of the present invention is to provide a combined broadband ocean bottom seismograph having single glass sphere, to solve the problem of the distortion of the horizontal signals recorded by the ocean bottom seismograph working in sea water environment.

To achieve the above object, the present invention provides a combined broadband ocean bottom seismograph with single glass sphere, comprising an anchor, a seismometer chamber, a functional chamber and a release mechanism. The anchor is provided at the bottom of the seismograph chamber and has a frame structure with a rigid ring at the center, for accommodating the seismometer chamber to be seated on the seabed and contact the seabed directly. The seismometer chamber comprises a bell-like protection hood facing downward. The top end of the seismometer sealed chamber is connected to the inner surface of the top bell-shaped protection hood via a plurality of cables, and its bottom is projected outside the opening of the bell-like protection hood and provided through the rigid ring of the anchor to be level with the bottom of the anchor. The functional chamber comprises a plastic instrument chamber and a glass instrument chamber secured in the plastic instrument chamber, the bottom of the plastic instrument chamber being fixedly connected to the outer surface of the top of the bell-like protection hood and the top end of the plastic instrument chamber being fixedly connected to the release mechanism; the release mechanism is provided above the functional chamber and connected to frames of the anchor via fusible tensioning steel wires so that the functional chamber and the seismometer chamber are held on the rigid ring at the center of the anchor.

The present invention has the following advantageous effect:

1. With the combined broadband ocean bottom seismograph with single glass sphere of the present invention, the seismometer is mounted inside the seismometer sealed chamber which is suspended from the bottom of the functional chamber via flexible cables, and the seismograph can be seated on the seabed directly when sunk to the seabed without multiple coupling structures so that the vibration signals from the seabed can be recorded directly and the problem of distortion of the horizontal signals recorded by the ocean bottom seismograph working in sea water environment can be solved effectively.

2. With the combined broadband ocean bottom seismograph with single glass sphere of the present invention, the seismometer sealed chamber is directly suspended at the bottom of the ocean bottom seismograph, so that the effect on the data recorded by the ocean bottom seismograph due to additional moments caused by additional structures of the ocean bottom seismograph is eliminated. The coupling structure between the ocean bottom seismograph and the seabed is improved such that the ocean bottom seismograph can be coupled to the seabed independently.

3. The combined broadband ocean bottom seismograph having with single glass sphere of the present invention is an improvement on the multifunctional ocean bottom seismograph with seven channels shown in FIG. 1 in the coupling manner between the seismograph and the seabed and in the whole assembly of the seismograph. So the performance of the ocean bottom seismograph is improved, the versatility of the ocean bottom seismograph and the interchangeability of the components in assembly are extended. And the operation in test and application are more convenient to meet the requirement in marine science study and deep water oil-gas detection.

4. With the combined broadband ocean bottom seismograph with single glass spheres of the present invention, the direct coupling between the ocean bottom seismometer and the seabed optimizes the coupling performance and reduces the distortion of horizontal signals due to the surge of sea water and can realize versatile ocean bottom seismic detection. Also, compared with the conventional ocean bottom seismograph with multiple glass spheres, the ocean bottom seismograph of the present invention has a different structure and is advantageous in weight, volume, and cost.

5. According to the combined broadband ocean bottom seismograph with single glass sphere of the present invention, due to the cable coupling manner, the ocean bottom seismograph is less affected by the surrounding accessory structures, the performance of the ocean bottom seismograph is improved, the influence of the additional moments on the data recording caused by the accessory structures of the ocean bottom seismograph is reduced and the coupling between the ocean bottom seismograph and the seabed is improved. Further, by controlling the density of the whole assembly to make it approximate to the density of sea water, the versatility of the ocean bottom seismograph and the interchangeability of the components in assembly are extended so that the operation in test and application is more convenient.

6. According to the combined broadband ocean bottom seismograph with single glass sphere of the present invention, by controlling the density of the whole ocean bottom seismograph to make it approximate to the density of sea water, the performance of the ocean bottom seismograph is improved greatly and the ocean bottom seismograph of the present invention is more advantageous in seismic observation in shallow sea environment (for example, among four territorial seas of China, except South China Sea, the water depth of Yellow Sea, East China sea and Bohai Sea are all less than 100 m) in which the adverse effect of the sea water flow should be eliminated as much as possible.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
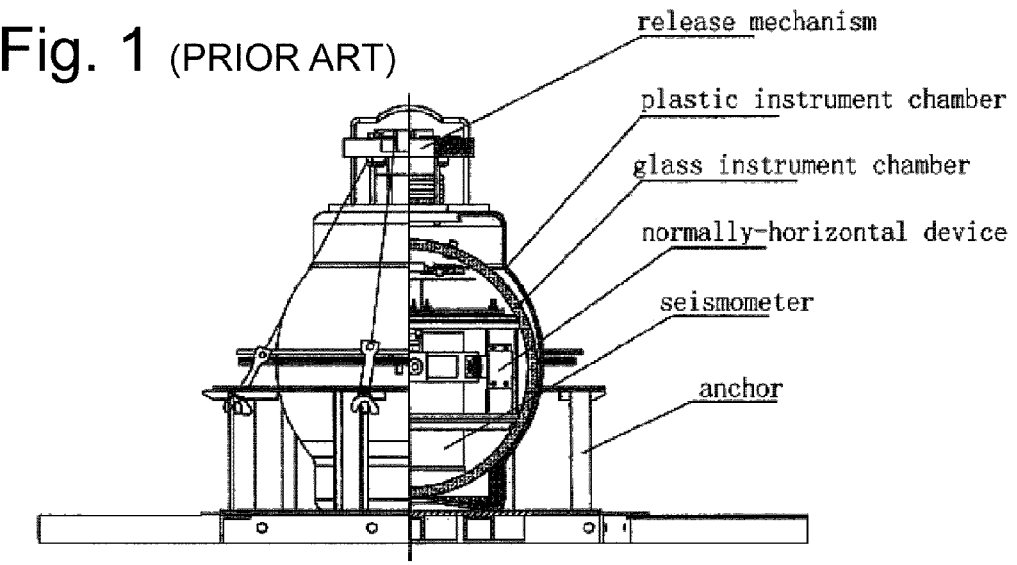
FIG. 1 is a structural view of a prior art multifunctional ocean bottom seismograph with seven channels.
Figure 2:
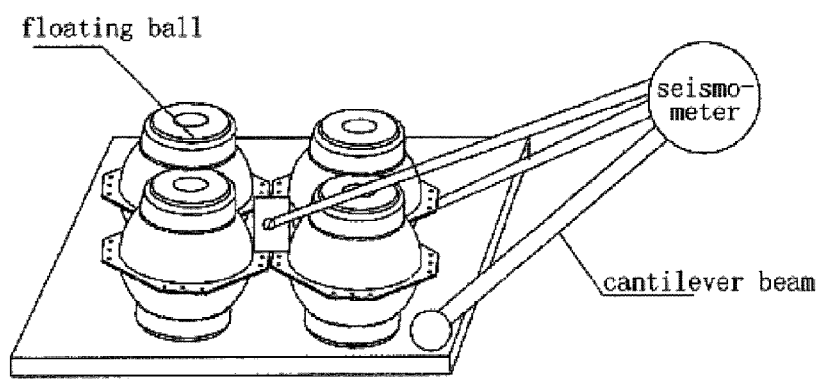
FIG. 2 is a perspective view of a prior art ocean bottom seismograph from Woods Hole Oceanographic Institution in the United States.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

An exemplary embodiment of the present invention will be described in detail with reference to FIGS. 3-9.

According to the combined broadband ocean bottom seismograph with single glass sphere of the present invention, a seismometer and a normally-horizontal device are assembled together and mounted in a seismometer sealed chamber which is suspended from the bottom of a functional chamber by flexible cables so that when the seismograph sinks to the seabed, it is seated on the seabed directly instead of coupling to the seabed via a glass chamber, a plastic chamber, an anchor and the like. The ocean bottom seismograph of the present invention is capable of recording the vibration signals of the seabed directly and solves the problem of distortion of the horizontal signals recorded by a conventional ocean bottom seismograph working in sea water environment.

Figure 3:
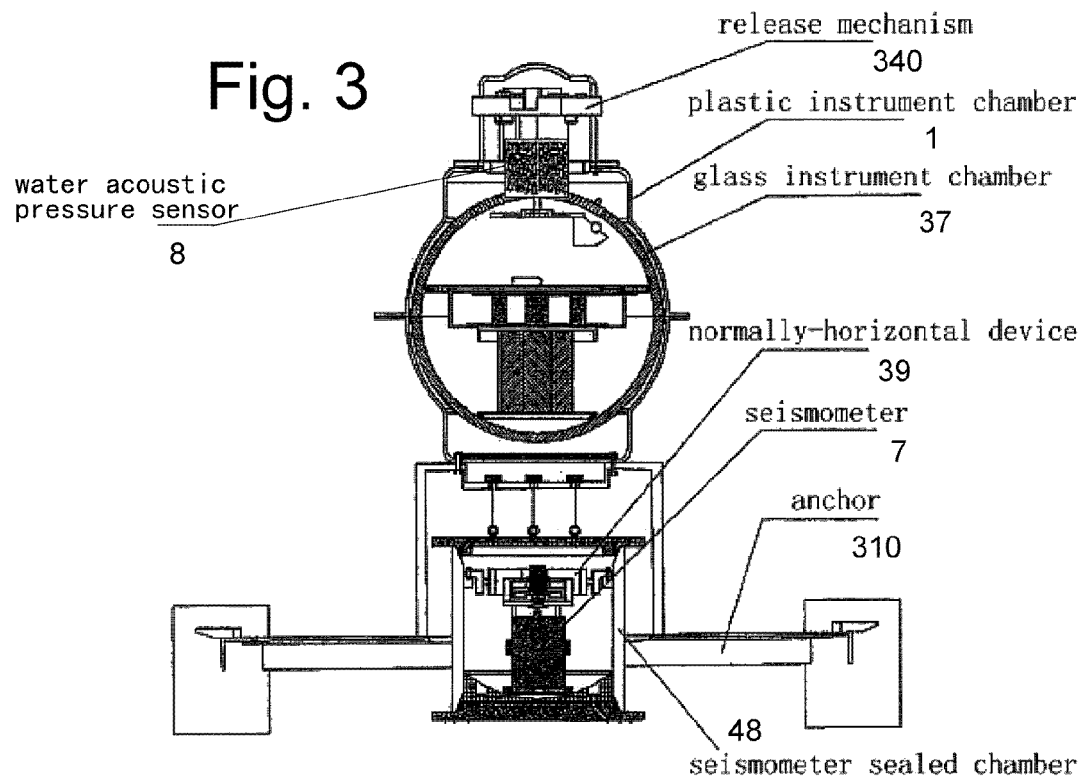
FIG. 3 is a sectional view of the combined broadband ocean bottom seismograph with single glass sphere according to an embodiment of the present invention.
Figure 4:
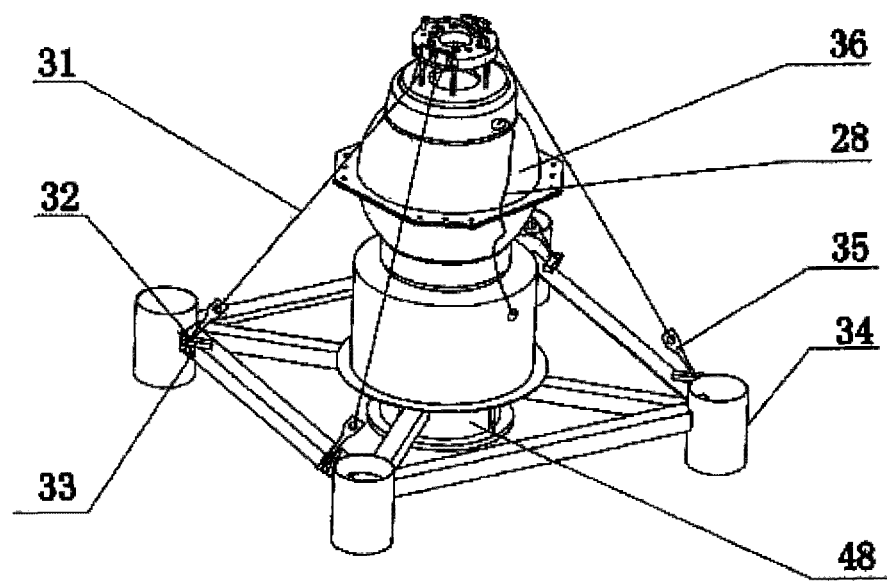
FIG. 4 is a perspective view of the combined broadband ocean bottom seismograph with single glass sphere according to an embodiment of the present invention.

FIGS. 3 and 4 show the structural views of the combined broadband ocean bottom seismograph having single global chamber according to an embodiment of the present invention. In particular, FIG. 3 is a sectional view of the combined broadband ocean bottom seismograph with single glass sphere according to an embodiment of the present invention and FIG. 4 is a perspective view of the combined broadband ocean bottom seismograph with single glass sphere according to an embodiment of the present invention.

Figure 5:
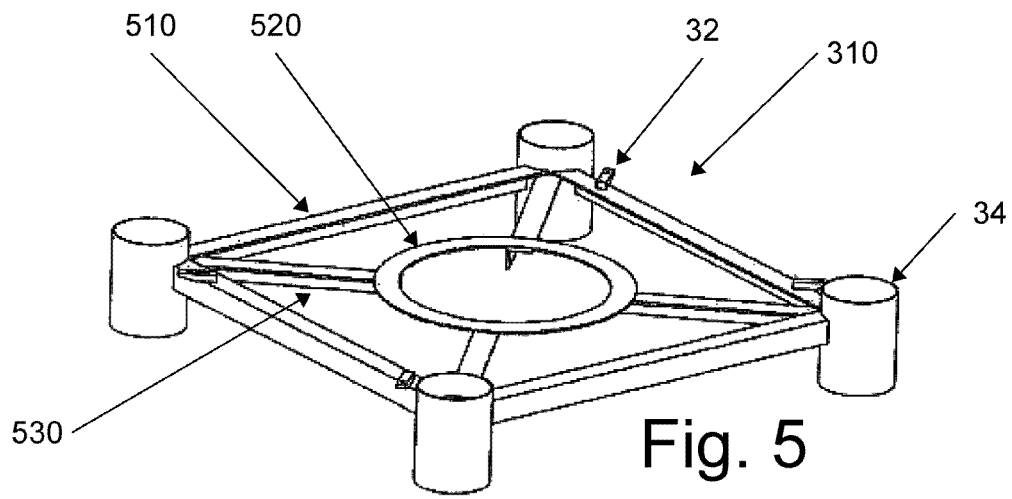
FIG. 5 is a perspective view of the anchor in the combined broadband ocean bottom seismograph with single glass sphere according to an embodiment of the present invention.

The ocean bottom seismograph according to an embodiment of the present invention comprises an anchor 310, a seismometer chamber 48, a functional chamber 37 and a release mechanism 340. The anchor 310 is provided at the bottom of the ocean bottom seismograph and has a rigid ring 520 provided at the center of a frame structure thereof for accommodating the seismometer chamber, so that a seismometer sealed chamber 48 received in the seismometer chamber is seated on the seabed and contact the seabed directly. The anchor 310 comprises a frame structure 510 as shown in FIG. 5 and is made of steel material by welding with the surface of the steel material being coated with antirust paint. The rigid ring 520 provided at the center of the frame structure is connected to the frames via four steel beams (e.g., 530) arranged in a cross shape. At the connection portions between the steel beams and the frames are provided four guide barrels (e.g., 34). Each guide barrel is formed by a through barrel with openings at two ends thereof and is fixedly connected to one frame. Further, a plurality of steel pawls (e.g., 32) are provided at the upper surfaces of the frames. Each steel pawl is provided with a tightening bolt. The guide barrel has a diameter of 120 mm and a height of 150 mm and is used for guiding the sea water while the ocean bottom seismograph is sinking down to the seabed, so that the ocean bottom seismograph can be kept in a vertical attitude while sinking and the sinking speed can be controlled to ensure the ocean bottom seismograph landing on the seabed stably. Also, the guide barrels provide a stable base for the ocean bottom seismograph in operation. If the seabed has a hard surface, the rigid anchor is able to couple to the seabed well; if the seabed has a soft surface such as a soft sand surface, the guide barrels can get into the soft seabed due to great pressure at the portion of the guide barrels and provide a stable base for the operation of the ocean bottom seismograph to resist the impact of the transversal sea water flow, at the same time, the surface area of the anchor near the seismometer chamber becomes large and the continuing sinking of the whole ocean bottom seismograph can be prevented. While the ocean bottom seismograph without the anchor floats upward, the anchor is left in the sea. Further, the ends of the guide barrels are level with the bottom of the seismometer sealed chamber projected outside the opening of the bell-shaped hood.

Figure 6:
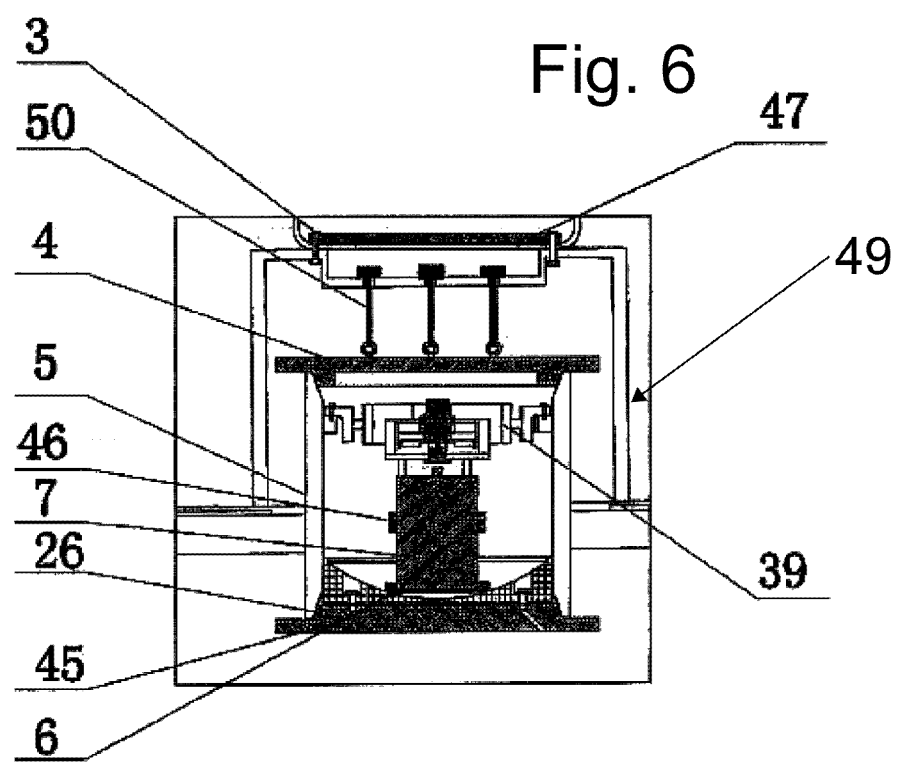
FIG. 6 is a structural view of the seismometer chamber in the combined broadband ocean bottom seismograph with single glass sphere according to an embodiment of the present invention.

The seismometer chamber is suspended underneath the functional chamber by three cables 28 and, for example, comprises the bell-shaped hood 49 and a seismometer sealed chamber, as shown in FIG. 6. The bell-shaped hood has an opening facing downward. The upper end of the seismometer sealed chamber is suspended from the inner surface of the top of the bell-shaped hood via a plurality of cables (e.g., 50). The bottom of the seismometer sealed chamber is projected outside the opening of the bell-shaped hood and is accommodated in the rigid ring of the anchor to be level with the bottom of the anchor. The diameter of the opening of the bell-shaped hood is matched with the diameter of the rigid ring at the center of the anchor. The edge of the opening of the bell-shaped hood is fixedly connected to the upper surface of the rigid ring of the anchor.

As shown in FIG. 6, a normally-horizontal device and a seismometer are mounted inside the seismometer sealed chamber. The normally-horizontal device and the seismometer are assembled together and secured inside the chamber shell of the seismometer sealed chamber by bolts. The normally-horizontal device includes a single-chip microcomputer, an attitude sensor and an attitude adjustment motor. The single chip microcomputer controls the attitude sensor and the attitude adjustment motor to perform attitude adjustment for the seismometer as below: the single chip microcomputer reads the real-time data of the attitude sensor and determines the inclination of the seismometer from the horizontal, and controls the attitude adjustment motor to conduct a lift movement of the seismometer to move it away from the bottom of the seismometer sealed chamber. At this time, the seismometer is leveled by virtue of its weight, and then the attitude adjustment motor is controlled to lay down the seismometer such that the seismometer is stably put back to the bottom of the seismometer sealed chamber. Thus an attitude adjustment is finished for one time.

On the other hand, according to the ocean bottom seismograph, of the prior art, with seven channels as shown in FIG. 1, the seismometer is submerged in sealed high viscosity silicone oil and the horizontal attitude of the seismometer is automatically adjusted by virtue of the flowability of the silicone oil. It is proved that the silicone oil is not suitable for transmitting and coupling the natural seismic signals because the frequency of the natural seismic signals may amount to several seconds and the silicone oil has flowability. Within a frequency range of 0.5-20 z, the silicone oil of such viscosity acts as a rigid substance, but for a 60 seconds natural seismic signal, the silicone oil does not show the characteristic of a rigid body.

According to the present invention, by using a single chip microprocessor to control the attitude sensor and the attitude adjustment motor to perform attitude adjustment for the seismometer, the attitude of the seismometer can be adjusted accurately, and the coupling between the seismometer and the bottom of the seismometer sealed chamber is rendered a rigid coupling such that the signal transmission is improved. The present invention improves the structure and principle of the normally-horizontal device, such that the normally-horizontal of the seismometer in the seismometer sealed chamber is maintained without filling silicone oil and an additional sealed structure is not necessary. Further, the volume and the weight both can be greatly reduced, and the range for attitude adjustment is extended up to about 30 degree. The angle of the seismometer is adjusted by the normally-horizontal device. A counterweight ring is bonded to an outer ring outside the barrel wall of the seismometer, and screw holes are distributed uniformly in the counterweight ring for fitting screws to configure the physical center of gravity of the seismometer.

Figure 7:
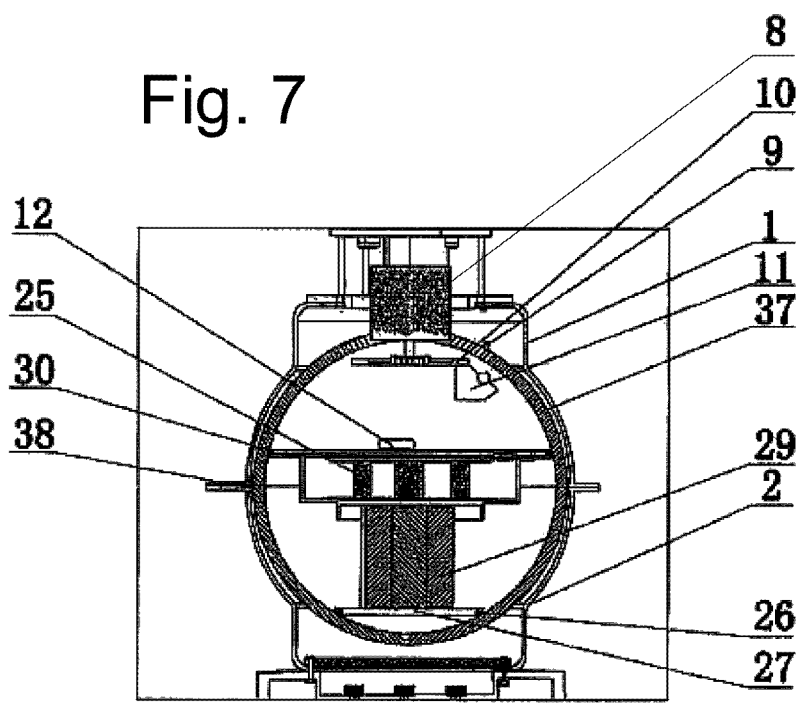
FIG. 7 is a structural view of the functional chamber in the combined broadband ocean bottom seismograph with single glass sphere according to an embodiment of the present invention.

The functional chamber comprises a glass global instrument chamber 37 defined by two glass shells and a plastic instrument chamber 1 defined by two plastic shells. The structure of the functional chamber 36 is shown in FIG. 7. The glass global instrument chamber 37 is secured inside the plastic instrument chamber. The bottom of the plastic instrument chamber is fixedly connected to the outer surface of the top of the bell-shaped protection hood, and the top end of the plastic instrument chamber is fixedly connected to the release mechanism 340. The seismometer and the functional chamber are connected to each other by water tight cables 28. The water tight cables pass through the walls of the functional chamber, the bell-shaped protection hood and the seismometer sealed chamber in this order. The functional chamber and the bell-shaped protection hood are fixedly connected by a plurality of bolts. Since the seismometer chamber and the functional chamber are connected to each other via flexible cables, they can be recovered as a single unit.

Figure 8:
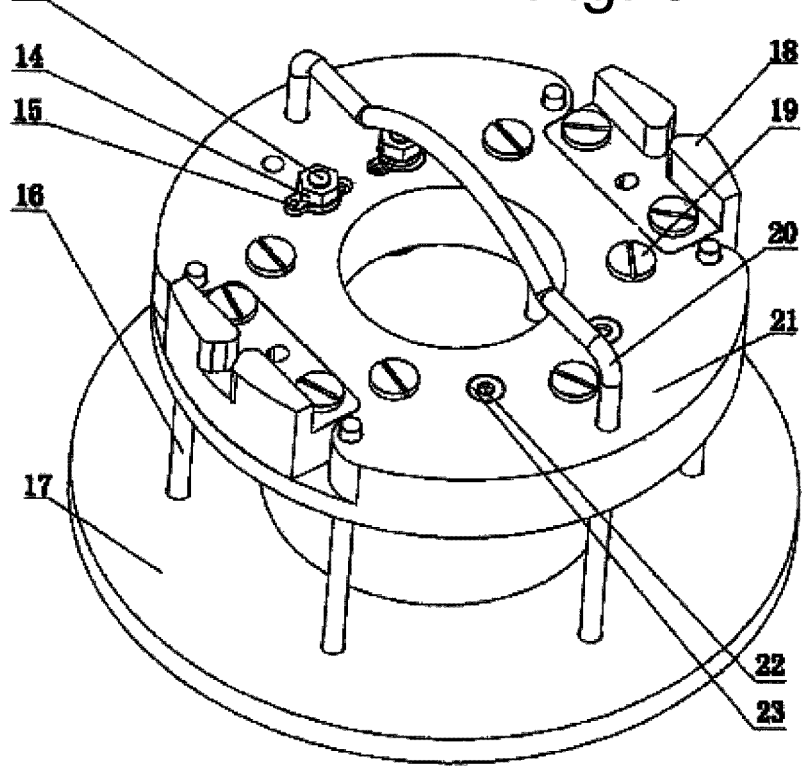
FIG. 8 is a perspective view of the release mechanism in the combined broadband ocean bottom seismograph with single glass sphere according to an embodiment of the present invention.
Figure 9:
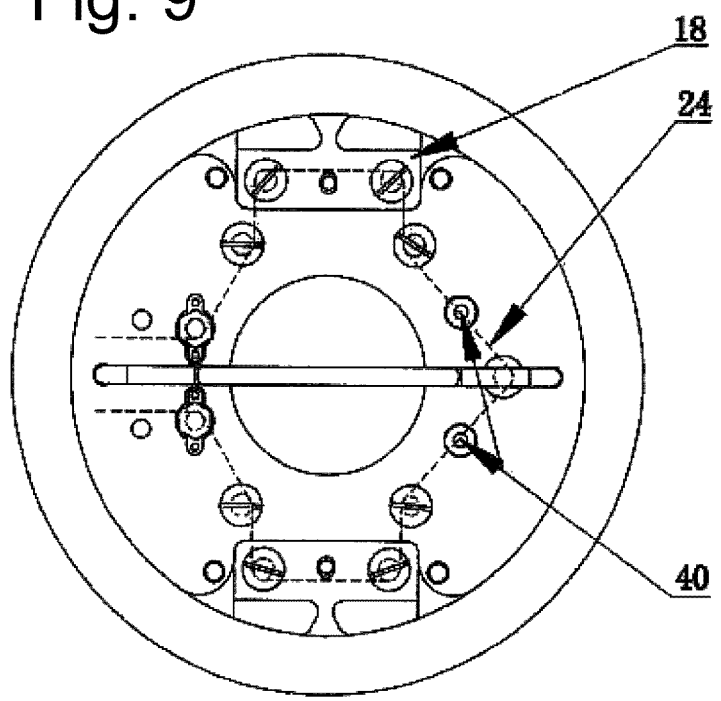
FIG. 9 is a plan view of the winding of the fusible steel wire in the release mechanism in the combined broadband ocean bottom seismograph with single glass sphere according to an embodiment of the present invention.

The release mechanism as shown in FIGS. 8 and 9 are provided above the functional chamber. The release mechanism 340 is connected to the frames of the anchor by fusible tensioning steel wires 24 so that the functional chamber and the seismometer chamber can be kept on the rigid ring at the center of the anchor. The release mechanism is of a two-layer structure, comprising a winding wire fixing plate 21, an annular bolt support plate 17 and a plurality of stainless steel threaded studs (e.g., 16). The winding wire fixing plate and the annular bolt support plate are arranged in parallel with each other in the up-down direction and fixedly connected to each other by the plurality of stainless steel threaded studs. Two stainless steel threaded studs located at the diameter of the winding wire fixing plate have upper ends which project out the upper surface of the winding wire fixing plate and connect with each other to form a hoisting ring. The annular bolt support plate has a central hole which has a diameter matched with the outer diameter of the top portion of the plastic instrument chamber.

In the combined broadband ocean bottom seismograph having single glass sphere of the present invention, the seismometer chamber and the functional chamber are independent units. In the seismometer sealed chamber, there is a broadband seismometer or a high frequency detector and the like which are operated in different frequency bands to realize ocean bottom seismic observation of different purposes. The functional chamber records seismic signals, monitors the working condition of the seismometer, provides release signal for the seismometer assembly, and transmits and receives an order for the seismometer assembly to float upward automatically. With the separate seismometer chamber and the functional chamber, it facilitates an exchangeable assembly, and reduces the assembling time and the number of times for packaging the glass sphere and therefore reduces the production period for mass production and reduces the workload.

In the functional chamber of the combined broadband ocean bottom seismograph with single glass sphere of the present invention, a water acoustic pressure sensor 8 is mounted on the top of the glass global instrument chamber, and the glass global instrument chamber is internally provided with a combined power supply, a water acoustic communication module, a radio beaconing machine, global positioning system (GPS), an electronic compass and the like, which are all adjusted and assembled together externally in advance and then put into the glass sphere. The plastic instrument chamber is divided into an upper half chamber and a lower half chamber. The glass chamber is fastened inside the plastic instrument chamber by bolts and also divided into an upper half chamber and a lower half chamber. The juncture between the upper half global chamber and the lower half global chamber is sealed by adhesive cement, which is then wound by 3M® adhesive band to protect the adhesive cement, thereby ensuring a good seal effect and long work time of the seismograph in the sea.

Inside the functional chamber of the combined broadband ocean bottom seismograph with single glass sphere of the present invention, the battery unit is secured by pressing an O-ring of a top cover of the battery unit and an O-ring of a support tray of the battery unit against the glass global instrument chamber. During the process of pressing the upper half chamber and the lower half chamber against each other, the O-rings have a certain degree of compression and friction is generated between the inner glass wall of the glass instrument chamber and the O-rings so that the battery unit is fixed without loosening and skewing. In such a manner, an occurrence of breakage of the inner glass wall can be avoided, which otherwise occurs in a conventional manner for securing the battery unit to the inner glass wall by adhesive. The top cover of the battery unit is provided with screw holes for fastening a control board, which functions to charge the battery unit. The attitude sensor, the radio beaconing machine, the electronic compass and the like are soldered on the control board for monitoring the operation condition of the seismometer. A water acoustic circuit control board is fastened by bolts at the top of the glass instrument chamber. The bolts are carried by the glass instrument chamber itself to fasten the water acoustic pressure sensor 8. The battery unit and the control boards may all be adjusted and assembled together externally and then put into the lower half global chamber of the glass chamber. Thereafter, the upper half of chamber is mounted and the internal devices are secured by pressing the O-rings by the glass instrument chamber.

Inside the seismometer chamber of the combined broadband ocean bottom seismograph with single sphere of the present invention, as shown in FIG. 6, the broadband seismometer and the normally-horizontal device are assembled together and fastened inside the seismometer sealed chamber by bolts. The seismometer sealed chamber is suspended from the inner surface of the protection hood by three flexible cables. Such a flexible connection protects the seismometer sealed chamber to avoid influence of vibration of surrounding components in the sea environment. The bell-shaped protection hood is connected to the lower half chamber of the plastic chamber included in the functional chamber via four bolts. The electric circuit blocks are connected by the water tight cables to make the ocean bottom seismograph capable of recording natural seismic signals and artificial vibration source signals and performing various control functions including release and recover function by the functional chamber.

The release mechanism is secured on the top of the shell of the plastic instrument chamber included in the functional chamber, and connected to the anchor via stainless steel wires. When the seismograph is recovered, the steel wires are fused and break off by the sea water electric erosion principle, and then the functional chamber and the seismometer chamber are floated up automatically to be recovered.

The combined broadband ocean bottom seismograph with single sphere of the present invention is assembled in a combined manner in which the functional chamber and the seismometer chamber are mounted as separate units instead of a conventional manner in which the seismometer and the control sections are integrated and assembled in a single glass chamber. In the conventional manner, exchangeability between various seismometers is not possible and a long installation time is needed. In the combined seismograph of the present invention, the electric circuit sections are connected to one another by water tight cables, and the functional chamber mainly functions to record the seismic signals, monitors the working condition of the seismometer, provides release signal for the seismograph, and transmits and receives the command of float up automatically the seismograph. As an independent functional chamber, it can be combined with various seismometers operated in different bands at the bottom thereof, such as an all attitude broadband seismometer or an all attitude high frequency detector, so as to realize ocean bottom seismic observation for different purposes. The protection hood of the seismometer chamber is fastened beneath the functional chamber by bolts so as to form the combined broadband ocean bottom seismograph having single global chamber of the present invention, which can realize interchangeability in assembly, shorten the assembly time and reduce the number of times for packing chamber balls so as to reduce the production period for mass production of the submarine seismograph and the workload.

Description of reference numerals shown in FIGS. 3-9 are as follow: 310: an anchor; 340: a release mechanism; 510: a frame structure; 520: a rigid ring; 530: steel beam; 1: upper plastic chamber; 2: lower plastic chamber; 3: bolt; 4: top cover of the seismometer chamber; 5: support tray; 6: arcuate base; 7: seismometer; 8: water acoustic pressure sensor; 9: vacuum gas nozzle; 10: water acoustic electric circuit control board; 11: stroboscopic lamp; 12: GPS antenna; 13: positive pole; 14: locking nut; 15: wire compression gasket; 16: stainless steel stud; 17: bolt support plate; 18: release slider; 19: wire winding nail; 20: stainless steel hoisting ring; 21: wire winding fixing plate; 22: negative pole; 23: negative pole protection sleeve; 24: fusible steel wire; 25: electric circuit control board; 26: O-ring; 27: battery unit support plate; 28: water tight cable; 29: battery unit; 30: top cover of the battery unit; 31: tensioning steel cable; 32: steel pawl; 33: hand nut 34: guide barrel; 35: fastening bolt; 36: functional chamber; 37: glass global instrument chamber (glass global instrument module); 38: adhesive cement; 39: normally-horizontal device; 40: steel wire fusible point; 45: bottom of the seismometer chamber; 46: counterweight ring; 47: reinforcing plate; 48: seismometer sealed chamber; 49: protection hood; and 50: cable.

The combined broadband ocean bottom seismograph having single global chamber of the present invention comprises the anchor, the seismometer chamber, the functional chamber and the release mechanism which are described in detail in the following.

1. Anchor. As shown in FIG. 5, the anchor is made of steel material coated with antirust paint by welding. A ring is welded at the center of the anchor to accommodate the seismometer. The center of the ring is hollow so that the seismometer can be seated on the seabed directly. Before the ocean bottom seismograph is put into use, the release slider 18 and the four steel pawls 32 are connected by four tensioning cables 31. The tightening bolt 35 is served to adjust the tension degree of the tensioning cables so as to adjust the degree of tightness between the seismometer and the anchor.

There are provided four guide barrels 34 each having a diameter of 120 mm and a height of 150 mm, which are welded on the periphery of the anchor. The guide barrels are served to guide the sea water during the sinking of the seismograph and control the sinking speed to ensure the stable landing of the seismograph. The guide barrels further provide stable base for the operation of the ocean bottom seismograph. When the ocean bottom seismograph floats up, the anchor is discarded in the sea.

The guide barrels also have the following function: if the seabed has a hard surface, the rigid anchor is able to couple to the seabed well; if the seabed has a soft surface, such as a soft sand surface, the guide barrels can get into the soft seabed due to great pressure at the portion of the guide barrels and provide a stable base for the operation of the ocean bottom seismograph to resist the impact on the ocean bottom seismograph due to the transversal sea water flow, at the same time, the surface area of the anchor near the seismometer chamber becomes large and the continuing sinking of the whole ocean bottom seismograph can be prevented.

Considering that the anchor is non recoverable, standard angle iron is used as the material to manufacture the anchor, which not only meets the requirements for rigidity and hardness as a working base, but also reduces the processing cost.

2. seismometer chamber. The seismometer chamber comprises bell-shaped protection hood and the seismometer sealed chamber, as shown in FIG. 6. The normally-horizontal device and the seismometer are mounted inside the seismometer sealed chamber. Specifically, the normally-horizontal device and the seismometer are assembled together and secured inside the chamber shell of the seismometer sealed chamber.

(1) the normally-horizontal device. The normally-horizontal device uses the attitude sensor and the attitude adjustment motor 3 to adjust the attitude of the seismometer 7. By improving the structure and principle of the normally-horizontal device, maintaining the normally-horizontal attitude does not need filling silicone oil and a sealed structure is not necessary. Further, the volume and the weight of the normally-horizontal device both can be greatly reduced, and the range for attitude adjustment is extended up to about 30 degree. Therefore, the ocean bottom seismograph of the present invention can work well under complicated ocean bottom landform condition.

(2) the seismometer. The seismometer may be selected as the broadband seismometer such as Trillium Compact Ocean Bottom Seismometer produced by Nanometrics Inc. The seismometer 7 and the normally-horizontal device are assembled together to be secured inside the chamber shell of the seismometer sealed chamber 48 by bolts, the operation angle thereof are adjusted by the normally-horizontal device. A counterweight ring is bonded to an outer ring outside a barrel wall of the seismometer, and screw holes for fitting screws are distributed uniformly in the counterweight ring to configure the physical center of gravity of the seismometer.

The seismometer sealed chamber is connected to the top of the bell-shaped protection hood by flexible cables 50 and the protection hood is installed beneath the functional chamber. Such a combined assembly provides a good coupling between the seismograph and the seabed for the operation of the seismograph at the ocean bottom. The conventional seismometer mounted inside the glass ball involves distortion of horizontal signals due to factors such as the height, the density, the weight of the seismograph and the like. According to the ocean bottom seismograph of the present invention, the density of the seismometer and the density of the sea water have little difference, and the ocean bottom seismometer is coupled to the seabed perfectly so that the seismometer is less affected by the external conditions, such as the plastic chamber.

3. Functional chamber. The functional chamber 4 is a recoverable section of the ocean bottom seismograph. As shown in FIG. 7, the functional chamber 4 includes an outer plastic instrument chamber and an inner glass instrument chamber. The glass instrument chamber may be selected to have a dimension of 17 inches, resist a pressure in 6000 m deep water, and provide a buoyancy of 25 KG in the water. The glass instrument chamber is internally provided with a combined power supply, a water acoustic communication module, a data acquisition system, a radio beaconing machine, a GPS, an electronic compass and the like, of which the total weight is not more than 8 KG. The plastic instrument chamber is divided into an upper half chamber and a lower half chamber. The glass instrument chamber are fastened inside the plastic instrument chamber by bolts and also divided into an upper half global chamber and a lower half chamber. The juncture between the upper half global chamber and the lower half global chamber is sealed by adhesive cement, which is then wound by 3M® adhesive band to protect the adhesive cement, so as to ensure a good seal effect and long work time of the seismograph in the sea.

The glass instrument chamber mainly includes the following electronic functional modules:

(1) Water acoustic communication module. The water acoustic communication module is integrated in a water acoustic control circuit board 10, for receiving a release command code from the deck and feeding it back to the control circuit board so as to realize the transmission of the control command of floating up the ocean bottom seismograph.

(2) Data acquisition system. The data acquisition system is integrated in a control circuit board 25, for acquiring and storing signals from three channels of the ocean bottom seismometer and the water acoustic pressure sensor. The data acquisition system has a small power of 0.2 W and can meet the requirement for long term seabed survey.

(3) Combined power supply. The battery unit of the ocean bottom seismograph may be lithium batteries and disposed on the battery tray 27 side by side. Each ocean bottom seismograph may have 12 lithium batteries. An internal power supply management module can monitor the power storage of the battery unit on real time, and when the power storage is less than a predetermined value, the ocean bottom seismograph will turn off all the electric power consuming devices except the water acoustic communication module so that the ocean bottom seismograph can still be normally recovered after being stayed in the sea one more year.

(4) data export. The ocean bottom seismograph (OBS) is internally provided with a universal serial bus (USB) interface module for high speed data exchange with a computer so as to realize high speed data extraction from the ocean bottom seismograph such as at a speed of 2 Mbyte/second without opening the glass global instrument chamber.

(5) wireless digital transmission module. The wireless digital transmission module is integrated on the control circuit board 25 with the transmitting power of 1-5 W, the transmitting distance of 5-10 Km, and the location accuracy within several tens of meters.

(6) flash light. When the ocean bottom seismograph is floated up, the flash light can effectively indicate the orientation and position of the ocean bottom seismograph at night so as to facilitate the recovery. The light source may be a light emitting diode (LED) which has high luminous efficiency, good penetration performance and can work continuously for over 12 hours.

4. release mechanism. As shown in FIG. 8, the release mechanism is of a two-layer structure, comprising a plurality of stainless steel threaded studs 16, an annular bolt support plate 17 and a winding wire fixing plate 21. The winding wire fixing plate 21 and the annular bolt support plate 17 are arranged in parallel with each other in the up-down direction and fixedly connected to each other by the plurality of stainless steel threaded studs 16. Two of the studs 16 located at the diameter of the winding wire fixing plate have upper ends which project from the upper surface of the winding wire fixing plate 21 and connect with each other to form a hoisting ring 20. The annular bolt support plate 17 has a central hole which has a diameter matched with the outer diameter of the top portion of the plastic instrument chamber 26.

A fusible steel wire 24 is wound into a loop via positive poles 13 and all winding wire pins 19 and is secured by locking nuts 14 and the winding wire pins 19. A release slider 18 is secured on the fixing plate 21. The fusible steel wire 24 may in contact with two native poles 22 which act as two fusing points, as shown in FIG. 9.

The ocean bottom seismograph is secured by the following process: firstly, the ocean bottom seismograph is accommodated on the anchor; then four tensioning steel cables are wound on the connection portion of the release slider 18; then the four tensioning steel cables are tensioned by hand nuts 33 so as to secure the ocean bottom seismograph.

After the ocean bottom seismograph is secured, the fastening bolts on the release slider 18 are removed and the steel cables 31 are further adjusted by hand nuts 33 to adjust the degree of tightness of the ocean bottom seismograph. When the ocean bottom seismograph is recovered, the steel wire 24 is fused at two points 40 by electrical erosion by using of the nature of sea water and thus the release slider 18 is released under the pull of the tensioning steel wires 31 so that the combined instrument chamber and seismometer chamber may float up due to the buoyancy of the sea water to be recovered.

The combined broadband ocean bottom seismograph with single sphere according to an embodiment of the present invention is put into use by the following steps: choosing launching position and orientation; launching the ocean bottom seismograph in the sea; when landing on the seabed, the ocean bottom seismograph may be acutely positioned by acoustic positioning by using a deck machine. After that, the internal seismometer and the digital acquisition device go into operation simultaneously to continuously record the ocean bottom seismic signals and store the data in the internal storage. When it is necessary to recover the ocean bottom seismograph, a recovery signal is transmitted by the acoustic deck machine in the sea area near the location of the ocean bottom seismograph. The ocean bottom seismograph receives the signal and start fusing the steel wires. In about five minutes, the ocean bottom seismograph is separated from the anchor and floats up automatically to the water surface. Then the ocean bottom seismograph transmits information on its position wirelessly. Based on that information or by visual observation, the position of the ocean bottom seismograph is determined and the ocean bottom seismograph is salvaged. Then the recorded data can be extracted for analysis and research.

The combined broadband ocean bottom seismograph with single glass sphere according to the present invention has the following advantage over the prior art:

1) the suspension structure of the seismometer sealed chamber. The seismometer is suspended below the functional chamber rather than installed inside the glass instrument cabin ball together with the control sections as conventional seismographs. According to the present invention, the data recordation of the seismometer is not affected by the surrounding components such as functional chamber and the anchor and therefore the serious distortion of the horizontal signals due to the surge of sea water can be reduced.

2) combined structure. The functional chamber and the seismometer chamber are combined together as separate units with the circuit sections thereof being connected via water tight cables. The functional chamber mainly serves to record seismic data, monitor the working condition of the seismometer, provide release signal to the ocean bottom seismograph, and transmit and receive the floating command for the ocean bottom seismograph. As a separate functional chamber, the bottom of the lower half of the plastic chamber is flexibly connected with the seismometer sealed chamber. If the seismometer sealed chamber is modified to mount a high frequency detector, an active source ocean bottom seismic observation can be performed. With such a combined installation, the seismic sensor can be exchanged quickly, the assembling time can be reduced and the times for packing ball can be reduced. At the same time, the production period for manufacturing the ocean bottom seismograph and the work load can be reduced.

3) Design of the anchor. The anchor is made of steel material coated with antirust paint by welding. An annular ring is welded in the center of the anchor for accommodating the ocean bottom seismograph and has a hollow center such that the seismometer can be seated on the seabed directly. Four guide barrels each having a diameter of 120 mm and a height of 150 mm are welded around the periphery of the anchor for guiding sea water during the sinking of the ocean bottom seismograph such that the ocean bottom seismograph can be kept in a vertical attitude during sinking and the sinking speed can be controlled to ensure the ocean bottom seismograph to land stably. Also, the guide barrels have a stabilizing function in a soft seabed environment for resisting transverse impact of sea water flow.

Although an exemplary embodiment has been shown and described, it would be appreciated by those skilled in the art that various changes or modifications may be made in the embodiment without departing from the principles and spirit of the disclosure, the scope of the invention is defined in the claims and their equivalents.

What is claimed is:

1. A combined broadband ocean bottom seismograph with single sphere, comprising:
   an anchor;
   a seismometer chamber;
   a functional chamber; and
   a release mechanism, wherein the anchor is provided at the bottom of the ocean bottom seismograph and has a frame structure with a rigid ring provided at the center of the frame structure for accommodating the seismometer chamber so that a seismometer sealed chamber in the seismometer chamber is seated on the seabed and in contact with the seabed directly; wherein the seismometer chamber comprises a bell-shaped protection hood with an opening facing downward and the seismometer sealed chamber with a top end connected to an inner surface of the top of the bell-shaped protection hood via a plurality of cables, and the bottom of the seismometer sealed chamber is projected outside the opening of the bell-shaped protection hood and accommodated in the rigid ring of the anchor to be level with the bottom of the anchor; wherein the functional chamber comprises a plastic instrument chamber and a glass instrument chamber secured in the plastic instrument chamber, the bottom of the plastic instrument chamber being fixedly connected to the outer surface of the top of the bell-shaped protection hood and the top end of the plastic instrument chamber being fixedly connected to the release mechanism; and wherein the release mechanism is provided above the functional chamber and connected to frames of the anchor via fusible tensioning steel wires so that the functional chamber and the seismometer chamber are held on the rigid ring at the center of the anchor.

2. The combined broadband ocean bottom seismograph with single glass sphere according to claim 1, wherein the anchor is made of steel material by welding wherein the surface of the steel material is coated with antirust paint, and the rigid ring provided at the center of the frame structure is connected to the frames of the frame structure via four steel beams arranged in a cross shape.

3. The combined broadband ocean bottom seismograph with single glass sphere according to claim 2, wherein four guide barrels are provided at the connection portions between the steel beams and the frames, the guide barrel comprising a through barrel open at two ends and fixedly connected to the frames; and a plurality of steel pawls are provided at the upper surfaces of the frames with each steel pawl being provided with a tightening bolt.

4. The combined broadband ocean bottom seismograph with single glass sphere according to claim 3, wherein the guide barrel has a diameter of 120 mm and a height of 150 mm and serves to guide the sea water while the ocean bottom seismograph is sinking so that the seismograph can be kept in a vertical attitude while sinking and the sinking speed can be controlled to ensure the ocean bottom seismograph landing on the seabed stably, and the guide barrel also provides a stable base for the seismograph during its operation at the seabed.

5. The combined broadband ocean bottom seismograph with single glass sphere according to claim 3, wherein the end of the guide barrel is level with the bottom of the seismometer sealed chamber projected outside the opening of the bell-shaped protection hood.

6. The combined broadband ocean bottom seismograph with single glass sphere according to claim 1, wherein the diameter of the opening of the bell-shaped protection bell is matched with the diameter of the rigid ring at the center of the anchor, and the edge of the opening of the bell-shaped protection bell is secured on the upper surface of the rigid ring.

7. The combined broadband ocean bottom seismograph with single glass sphere according to claim 1, wherein a normally-horizontal device and a seismometer are mounted inside the seismometer sealed chamber, and the normally-horizontal device and the seismometer are assembled together to be secured inside the chamber shell of the seismometer sealed chamber by bolts.

8. The combined broadband ocean bottom seismograph with single glass sphere according to claim 7, wherein the normally-horizontal device includes a single-chip microcomputer, an attitude sensor and an attitude adjustment motor, wherein the single chip microcomputer controls the attitude sensor and the attitude adjustment motor to perform attitude adjustment for the seismometer by the following steps:

the single chip microcomputer reads the real-time data of the attitude sensor;

determines the inclination of the seismometer from the horizontal; and controls the attitude adjustment motor to conduct a lift movement of the seismometer to move it away from the bottom of the seismometer sealed chamber; at this time, the seismometer is leveled by virtue of its own weight, and then the attitude adjustment motor is controlled to lay down the seismometer, and the seismometer is stably put back to the bottom of the sealed chamber, thus an attitude adjustment is finished for one time.

9. The combined broadband ocean bottom seismograph with single glass sphere according to claim 7, wherein the angle of the seismometer is adjusted by the normally-horizontal device, and a counterweight ring is bonded to an outer ring outside a barrel wall of the seismometer, and screw holes for fitting screws are distributed uniformly in the counterweight ring to configure the physical center of gravity of the seismometer.

10. The combined broadband ocean bottom seismograph with single glass sphere according to claim 7, wherein the seismometer chamber and the functional chamber are connected to each other by water tight cables, and the water tight cables pass through the walls of the functional chamber, the bell-shaped protection hood and the seismometer sealed chamber.

11. The combined broadband ocean bottom seismograph with single glass sphere according to claim 7, wherein the seismometer chamber and the functional chamber are connected to each other by flexible cables to form an integrated unit to be recovered as a whole.

12. The combined broadband ocean bottom seismograph with single glass sphere according to claim 1, wherein a water acoustic pressure sensor is mounted on the top of the glass global instrument chamber, and the glass global instrument chamber is internally provided with a combined power supply, a water acoustic communication module, a radio beaconing machine, global positioning system (GPS), an electronic compass, which are all adjusted and assembled together externally in advance and then put into the glass global instrument chamber.

13. The combined broadband ocean bottom seismograph with single glass sphere according to claim 1, wherein the plastic instrument chamber is divided into an upper half chamber and a lower half chamber, and the glass global instrument chamber are fastened inside the plastic instrument chamber by bolts and also divided into an upper half chamber and a lower half chamber with the juncture between the upper half chamber and the lower half chamber being sealed by adhesive cement, which is then wound by 3M® adhesive band, to protect the adhesive cement to attain seal effect.

14. The combined broadband ocean bottom seismograph with single glass sphere according to claim 1, wherein the release mechanism is provided on the top of the plastic instrument chamber and connected to frames of the anchor via fusible tensioning steel wires so that the functional chamber and the bell-shaped protection hood of the seismometer chamber are held on the rigid ring at the center of the anchor.

15. The combined broadband ocean bottom seismograph with single glass sphere according to claim 14, wherein the release mechanism is of a two-layer structure, comprising an annular winding wire fixing plate, an annular bolt support plate and stainless steel threaded studs, wherein the annular winding wire fixing plate and the annular bolt support plate are arranged in parallel with each other in the up-down direction and fixedly connected to each other by a plurality of stainless steel threaded studs, and two of the studs located at the diameter of the annular winding wire fixing plate have upper ends which are projected from the upper surface of the annular winding wire fixing plate and connected with each other to form a hoisting ring.

16. The combined broadband ocean bottom seismograph with single glass sphere according to claim 15, wherein the annular bolt support plate has a central hole which has a diameter matched to the outer diameter of the top portion of the plastic instrument chamber.

\* \* \* \* \*